(12) United States Patent
Zafarana

(10) Patent No.: US 7,960,956 B2
(45) Date of Patent: Jun. 14, 2011

(54) CONTROLLER FOR DC-DC CONVERTERS WITH BYPASS COMPENSATION

(75) Inventor: Alessandro Zafarana, Milan (IT)

(73) Assignee: STMicroelectronics S.r.l., Agrate Brianza (MI) (IT)

( * ) Notice: Subject to any disclaimer, the term of this patent is extended or adjusted under 35 U.S.C. 154(b) by 511 days.

(21) Appl. No.: 11/756,046

(22) Filed: May 31, 2007

(65) Prior Publication Data

US 2008/0157736 A1 Jul. 3, 2008

(30) Foreign Application Priority Data

May 31, 2006 (EP) ..................... 06425370

(51) Int. Cl.
*G05F 1/00* (2006.01)
(52) U.S. Cl. .................. 323/284; 363/56.03; 323/286
(58) Field of Classification Search .................. 323/282, 323/284, 285, 286; 363/56.03
See application file for complete search history.

(56) References Cited

U.S. PATENT DOCUMENTS

| | | | |
|---|---|---|---|
| 6,057,675 A * | 5/2000 | Tateishi | 323/283 |
| 6,181,120 B1 | 1/2001 | Hawkes et al. | |
| 6,246,220 B1 * | 6/2001 | Isham et al. | 323/224 |
| 6,791,306 B2 * | 9/2004 | Walters et al. | 323/288 |
| 6,828,766 B2 * | 12/2004 | Corva et al. | 323/284 |
| 7,019,503 B1 | 3/2006 | Ortiz et al. | |
| 2005/0242786 A1 * | 11/2005 | Sawyers et al. | 323/211 |
| 2006/0087296 A1 * | 4/2006 | Marino et al. | 323/222 |

FOREIGN PATENT DOCUMENTS

| | | |
|---|---|---|
| EP | 1 367 703 A1 | 12/2003 |
| EP | 1 519 474 A2 | 3/2005 |
| EP | 1 650 858 A2 | 4/2006 |
| WO | WO 03/017455 A2 | 2/2003 |

OTHER PUBLICATIONS

European Search Report dated Jun. 22, 2007 for European Application No. EP 06 42 5370.

* cited by examiner

*Primary Examiner* — Harry Behm
*Assistant Examiner* — Matthew Grubb
(74) *Attorney, Agent, or Firm* — Lisa K. Jorgenson; Stephen Bongini; Fleit Gibbons Gutman Bongini & Bianco PL

(57) ABSTRACT

A controller is provided for DC-DC converters of the type associated with a half-bridge driving stage of at least one inductive load, with a pair of power MOS transistors in High-side and Lowside configuration being driven by a corresponding converter. The controller includes an input for connection to a terminal of the inductive load. The controller also includes a read block for reading an inductive load phase current at the terminal, an over current comparator having a first input coupled to an output of the read block, and a bypass compensation network including an error amplifier block having a first input coupled to the terminal through a voltage divider, and a second input coupled to a reference potential. The compensation network has an output that is coupled to a second input of the over current comparator, and an output of the over current comparator is supplied to the DC-DC converter.

19 Claims, 8 Drawing Sheets

CONTROLLER FOR DC-DC CONVERTERS WITH BYPASS COMPENSATION

CROSS-REFERENCE TO RELATED APPLICATIONS

This application is based upon and claims priority from European Patent Application No. 06 425 370.1, filed May 31, 2006, the entire disclosure of which is herein incorporated by reference.

FIELD OF THE INVENTION

The present invention relates to electronic circuits, and more specifically relates to a controller for DC-DC converters with bypass compensation that can be used in stand alone or multi-phase mode.

BACKGROUND OF THE INVENTION

As is well known, the evolution of the electrical characteristics of processors for PCs, workstations, and servers obliges manufacturers to study new, more flexible and economic solutions for supplying various peripherals such as DDR and DDR2 memory banks, chipsets, graphic boards, etc.

At present, the flexibility and cost criteria orient the research toward solutions that are capable of adapting to the different segments of use which are characterized by a variety of input supply voltages (buses of 12V, 5V, and 3.3V are the most common) and output supply voltages (for example, 2.5V and 1.25V for DDR memories, 1.8V and 0.9V for DDR2 memories, 1.8V or 1.5V for chipsets; and 1.7V-1.3V for the GPU processor of graphic boards).

Also the required currents vary enormously, especially for different end uses, such as for desktops of the performance, main stream, and value types, servers of the high end and low end types, etc.

It is known that the most efficient and least expensive system for realizing DC-DC converters of the high current switching type is the multi-phase system shown in FIG. 1, in which the current of each phase is generally set in a range of 15 to 30 A. For low current applications (<15 A), the single-phase switching converter is the most advantageous choice from the economic point of view.

The known multi-phase converter uses a classical control system of the peak current mode type for each phase. The main advantage of a current mode system is due to the fact that, if each phase uses the same control method, when multiple DC-DC converters are placed in parallel in multi-phase, the desired current sharing is obtained automatically, saving valuable resources in terms of package pins and occupied silicon area.

In fact, the choice of current mode systems seems to even be an inescapable choice.

Although advantageous under several aspects, these peak current mode systems show a load effect. That is, when the output load (i.e., the current) varies, the output voltage is set not at the desired regulation value but at a new value which diverges from the one set on the basis of the choice of some parameters, both internal and external, of the device.

In the supply systems of CPU processors this effect is desired and is known as "droop" or "voltage positioning effect", but the processor performance and reliability depend on its accuracy.

However, for ensuring this desired effect, particular control techniques are necessary. Unfortunately, in current mode systems such as the peak current mode, this load effect is not at all accurate and can show a variance up to 50%.

If a DC-DC converter were designed with the purpose of minimizing this effect, the resulting current sharing would be unsatisfactory when multiple phases are associated in parallel.

Moreover, the peak current mode has a minimum working duty cycle D below which it cannot operate and which thus limits the range of applications since Vout=D×Vin.

For reading the phase current, it is necessary to use two pins (those connected across the inductance) and thus if there are plural phases in parallel the number of pins remarkably increases.

To limit the number of pins to a maximum of twenty-eight, the integrated drivers turn on and off the power MOS transistors of the highside driver type taking, as reference, not so much the phase nodes as directly the ground potential.

This operation saves two pins but can be very dangerous since it can generate false non-controlled turns-on of the power MOS transistors.

Thus, control systems with current mode DC-DC converters, in particular of the peak current mode type, show the following advantages: intrinsic current sharing, and reading inductance current with a clean signal and continuous time; and the following disadvantages: load effect, minimum Duty Cycle, two pins per phase to read the inductance current, power MOS transistors referred to ground rather than to phase, and lack of a PGOOD signal.

A known technical solution trying to overcome these drawbacks is incorporated in a converter commercially known as the "Intersil ISL644x", which is manufactured by Intersil.

In this device the problem of the load effect is overcome due to a control of the current mode type, however not of the peak current mode type, and the phase current is read due to the voltage fall on the power transistors of the Lowside and subsequently sampled by erasing the current ripple.

In this way, a single pin (the phase one) is enough for reading the current on the Lowside, which is measured with respect to the ground of the controller rather than on the source terminal of the Lowside.

The problem of this known device is that, due to the lack of pins, the compensation network is integrated and the switching frequency is not programmable. Therefore, the desired flexibility is substantially lost in the resulting lack of package resources.

Moreover, the use of the information of the current taken from the voltage fall across the Lowside implies that this information is sampled (in the track&hold mode) when the Lowside is turned on and maintained when the Lowside is turned off. This eliminates, or strongly reduces, the current ripple, but, being that the power drivers are integrated in the same device, there is the risk that the beginning of the hold of the current information already sampled (hold) occurs in correspondence with a transition of the driver (usually also drivers of the remaining phases). The hold of the information temporarily stores switch noise and generates a malfunction of the whole system, which is known as "crossnoise".

Therefore, this known solution shows the following drawbacks: inner and little flexible compensation network, maximum duty cycle limited at 70% to ensure the reading of the current on Lowside, non-programmable switching frequency, and inner crossnoise.

A second known solution is known as the "NCP5425" controller of On Semiconductor, which integrates two voltage-mode controllers and realizes the current sharing by using the error amplifier of a second controller, whose pins are all available.

This technique allows management of the current sharing but not programming of the distribution of the currents in the phases unless different sense resistances are available.

The current reading occurs on the inductance and not on the Lowside power transistors. This makes the circuitry necessary for preventing crossnoise problems and for sampling the signal superfluous.

However, the drawback of this controller is in the drivers, which supply only 4V at the maximum driving for applications with Vin of 12V. Moreover, power Highside driver transistors are driven towards the device ground, which is unique and in common both for the analog and power part.

SUMMARY OF THE INVENTION

An object of the present invention is to overcome the limits and/or drawbacks which affect the known devices and to provide a single controller for DC-DC converters that can be used in multi-phase applications, and that has such structural and functional characteristics as to allow operation in current mode, and in particular a peak current mode.

One embodiment of the present invention provides single DC-DC converters of the switching type, each with its own controller and each operating with all the usual supply buses employed in such applications, that can be associated together in a multi-phase structure which can ensure both current sharing and interleaving. Each single DC-DC converter thus structured can also operate in stand-alone mode.

Another embodiment of the present invention provides a controller with bypass compensation for applications in stand alone or multi-phase mode, of the type associated with a driving half-bridge stage of at least one inductive load with a pair of power MOS transistors in Highside and Lowside configuration being driven by a corresponding converter. The controller has an input for connection to a terminal of the inductive load. The controller also includes a read block for reading an inductive load phase current at the terminal, an over current comparator having a first input coupled to an output of the read block, and a bypass compensation network including an error amplifier block having a first input coupled to the terminal through a voltage divider, and a second input coupled to a reference potential. The compensation network has an output that is coupled to a second input of the over current comparator, and an output of the over current comparator is supplied to the DC-DC converter.

The characteristics and the advantages of the controller according to the present invention will be apparent from the following description of an embodiment thereof given by way of indicative and non-limiting example with reference to the annexed drawings.

DETAILED DESCRIPTION OF PREFERRED EMBODIMENTS

Preferred embodiments of the present invention will be described in detail hereinbelow with reference to the attached drawings.

Figure 1:
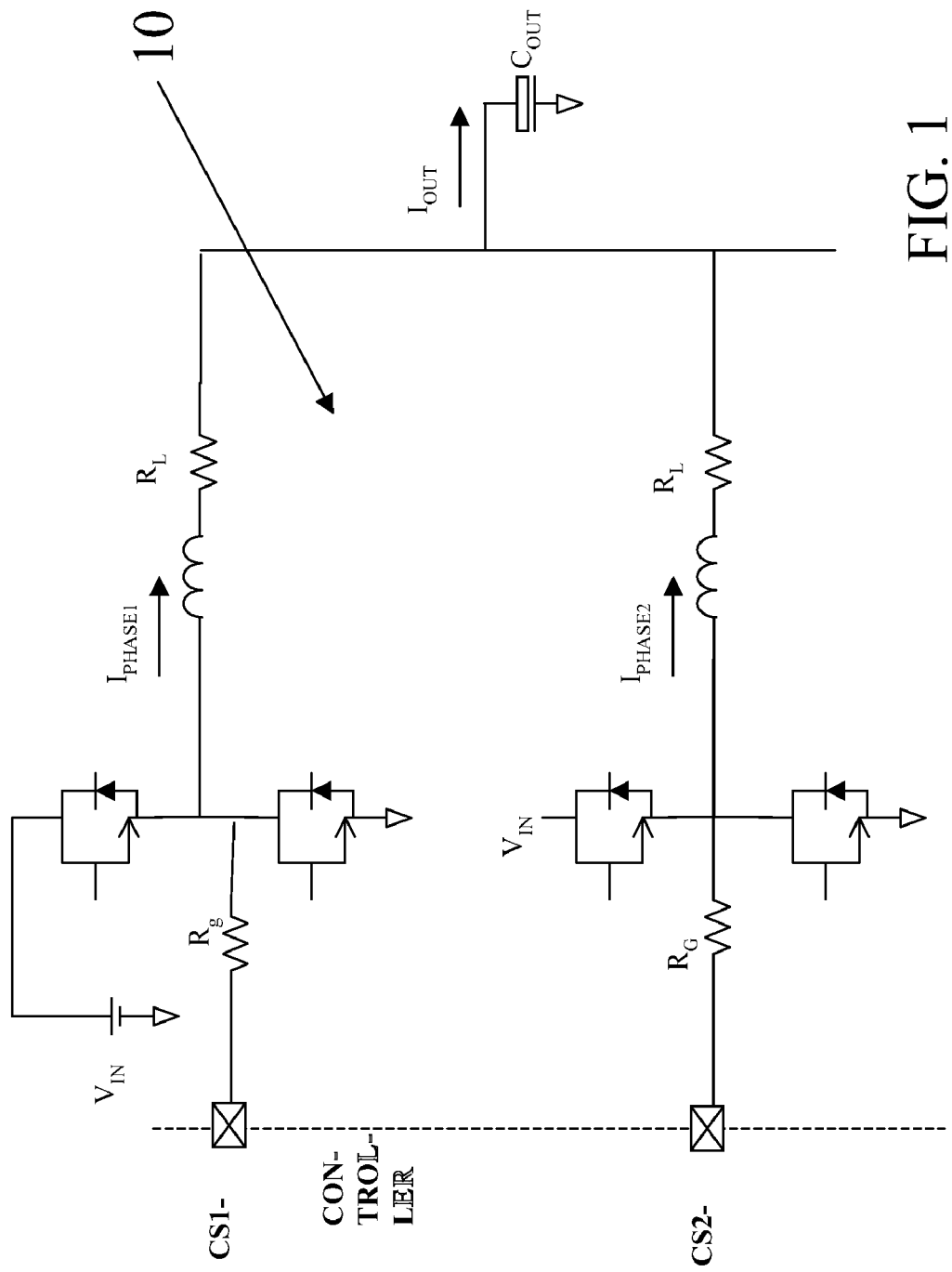
FIG. 1 shows a view of a pair of inductive loads driven by respective output pins of a DC-DC converter device equipped with a known controller.
Figure 2:
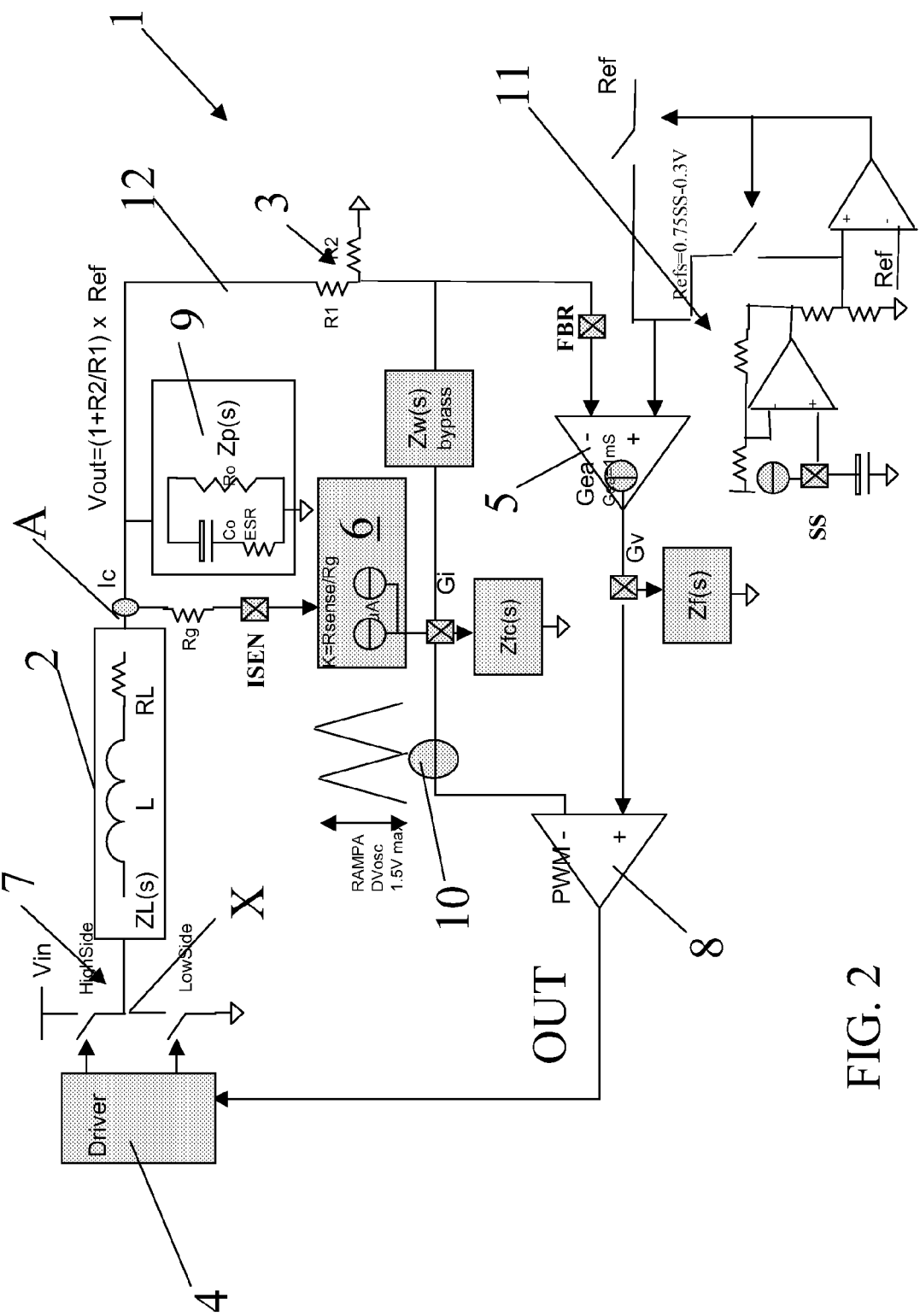
FIG. 2 shows a view of a controller for a DC-DC converter according to one embodiment of the present invention.
Figure 3:
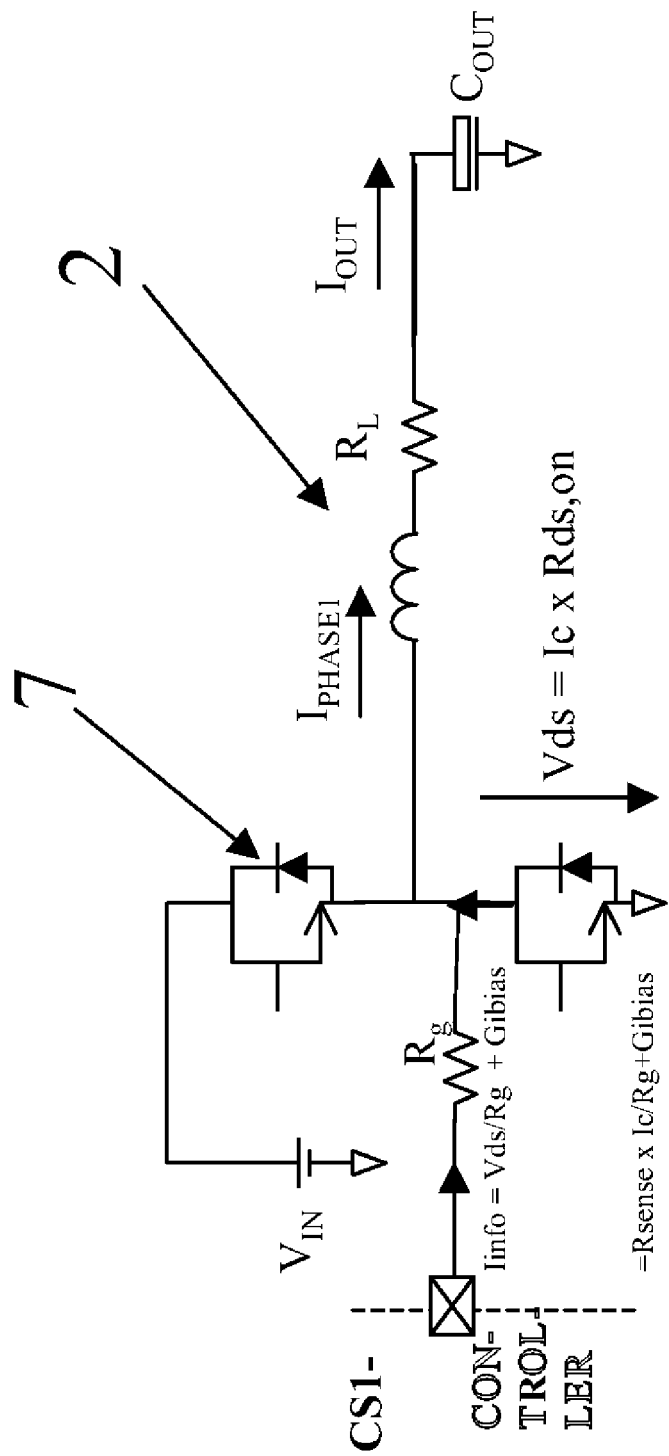
FIG. 3 shows a view of an operating mode of the controller of FIG. 2.

FIG. 2 shows a controller for DC-DC converters according to one embodiment of the present invention. This controller advantageously can be used for multi-phase applications by associating in parallel multiple controllers of the same type.

The controller 1 has been expressly provided with a bypass compensation network 11. The controller 1 is associated with a DC-DC converter indicated by the driving block 4, which acts on a power structure 7 that is formed by a half-bridge stage of power MOS transistors having a Highside and a Lowside. The interconnection node X between the Highside and Lowside portions is connected to a terminal of an inductive load 2, which represents the phase to be driven. The load 2 is indicated in FIG. 2 with an LR circuit comprising an inductance L and a resistance RL. Globally, the impedance of this load is indicated with $ZL(s)$.

The opposite terminal of the load 2 is indicated as node A and represents the point at which the phase current Ic (coil current) is drawn from the controller 1. In substance, the node A represents an input for the controller 1.

The controller 1 comprises a read block 6 of the phase current Ic which is characterized by a gain $K=Rsense/Rg$. A resistance Rsense is provided for reading the current Ic and is substantially the resistance Rds, on of the power MOS transistor of the Lowside 7.

A resistance Rg is connected between the node A and the read block 6, and is the resistance through which the voltage across the transistor Rds, on of the Lowside is transformed into a current.

Between the output of the read block 6 at node Gi and the converter 4, an oscillator 10 and an Over Current comparator 8 with two inputs are connected in series. The inverting input of the comparator 8 receives the signal from the node Gi, while the other non-inverting input receives the signal from an output node Gv of the compensation network 11.

Between the node Gi and a ground potential GND, an impedance $Zfc(s)$ is provided. The inner information of the current is summed to a reference current of 50uA, known as Gibias.

A circuit 9 with RCR components is connected between the node A and the read block 6, substantially in parallel to the resistance Rg. This circuit 9 globally has an impedance $Zp(s)$.

A further connection 12 is provided between the node A and the node Gi. On this connection 12, a voltage divider 3 and a bypass impedance $Zw(s)$ are provided.

The impedances $ZL(s)$ and $Zp(s)$ are in reality part of the DC-DC converter. These impedances, together with the switching frequency, are chosen by the user according to several considerations, such as efficiency, response speed, precision, etc.

For example, the impedances Zfc and Zw are chosen so as to ensure the performance on the basis of the controller-converter system.

The divider 3, comprising the resistances R1 and R2, has the purpose of amplifying the reference potential of the controller Ref and thus of determining, with accuracy, the desired value of the output OUT.

The reference potential Ref of the compensation network 11 can be chosen, for example, as Ref=0.7V, and represents the minimum adjustable voltage. Other values could be used as well.

In the compensation network 11, a block 5 (Gea) is provided, which represents an Error Amplifier that is common for most of the regulation systems of the switching type. However, different from the usual Error Amplifiers comprising operational amplifiers which operate in feedback, this block 5 is a simple transducer (i.e., it transforms, with open loop and without feedback, the voltage difference at its inputs (Ref-FBR) into a current through the gain Gea).

In this embodiment, by way of mere indication and non-limiting example, this gain can be equal to 1 mS.

In the regulation area of the output voltage (+/−10%), the transducer must maintain its gain. Thus, referring to the maximum output of 3.3V, it is necessary that for about +/−300 mV of |Ref-FBR| the gain remains constant.

The node Gv at the output of the block 5 is connected to an input of the Over Current comparator 8 and also to ground through a compensation impedance Zf(s).

Not to influence the compensation impedance Zf, it is necessary that the Gea output resistance (Ro) is very high, at least 100 Mohm; this output resistance must be maintained at least in the operation range +/−300 mV of |Ref-FBR|.

When the current of the inductance L increases up to its highest value (Iocp), the signal inner current equal to Ic×K reaches a highest current Ilim (equal, for example, to 100 uA), then the Over Current comparator 8 is released and forces the power MOS transistor of the Lowside 7 to remain off until the Over Current signal disappears.

For detecting the current signal from the power MOS transistor of the Lowside 7, it is necessary to sample the voltage signal across the component. The sampling (TRACK) and maintenance (HOLD) time intervals of the information must be accurately chosen so as to avoid the beginning of the HOLD phase occurring in correspondence with a switch of any power MOS transistor of the structure 7.

How these intervals are chosen is explained below.

The node GI at the output of the read block 6 represents in voltage the foundation whereon the triangular PWM ramp of the oscillator 10 (of height Dvosc) develops.

This foundation is not constant but suffers from the operation conditions of the system. If in the DC-DC converter 4 there is an increase of the current of the inductance L, then the signal Ic×K reproduces it and due to the impedance Zcc it generates an increase of the voltage level GI, in practice it shifts up the PWM ramp.

For the correct operation of the controller 1 it is necessary to be sure that the device supply guarantees the space for the movement of the node GI. If Vdd is the inner supply of the device and Vdrop is the space in voltage from the ground or Vd necessary so that the circuits operate correctly, the following results.

$$Rcc := \frac{Vdd - Vdrop - DVosc}{Gibias + Ilim}$$

Moreover, Rcc×Gibias>Vdrop
where Rcc is the value of Zcc at void frequency (i.e., continuous).

Typical values are Vdd=5V with Vdrop=0.5V, or Vdd=3.5V with Vdrop=0.25V.

To ensure the operation of the system and the Over Current protection 8 it is necessary to ensure that at each cycle the current of the MOS transistor of the Lowside is updated. It is thus necessary to limit the maximum duty cycle to about 80% (loadless duty clamp), so as to ensure a small turn-on interval of the Lowside.

To generate the digital signal with an 80% constant duty cycle it is necessary to generate a threshold referred to the node Gi. The comparator 8 will compare this threshold with the signal of the PWM ramp to produce the desired signal.

When the system is pushed to the maximum possible current (over current), the current of the inductance ZL would show an excessive ripple if there were only the loadless duty clamp; this would shift up the value of the maximum current that can be supplied with respect to the programmed value.

In fact, in current protection with L=350 nH, Vin=12V, Fsw=500 KHz, the inductance current ripple would be: Vin×0.8/(L Fsw)=54A. It is thus necessary that when the current increases the duty clamp decreases.

Exactly for this purpose, the DCLAMP pin allows programming of a voltage Vdc which is compared with the clamp of the comparator 8.

Figure 4:
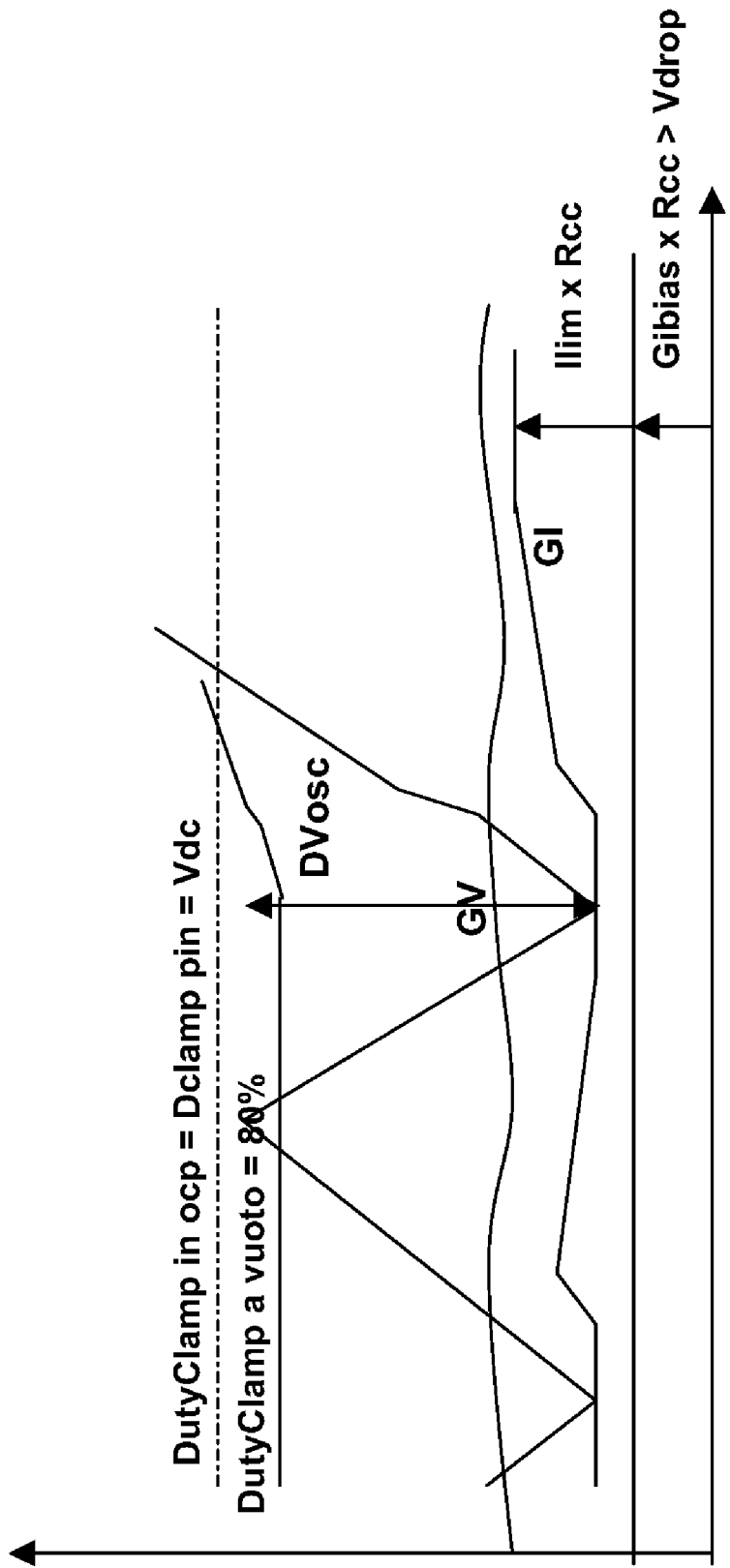
FIG. 4 shows a diagram of voltage values in the controller of FIG. 2 as a function of time.
Figure 5:
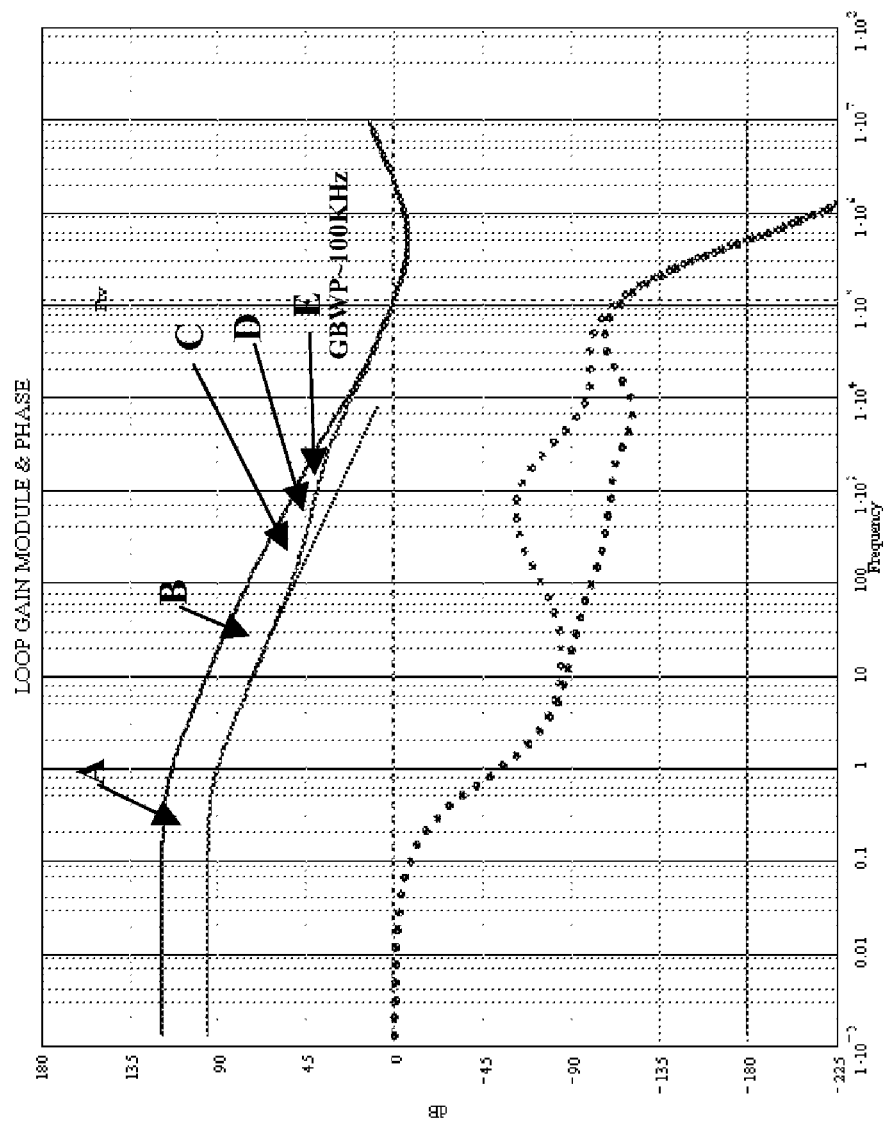
FIGS. 5 to 8 show simulation results for a controller according to an embodiment of the present invention.
Figure 6:
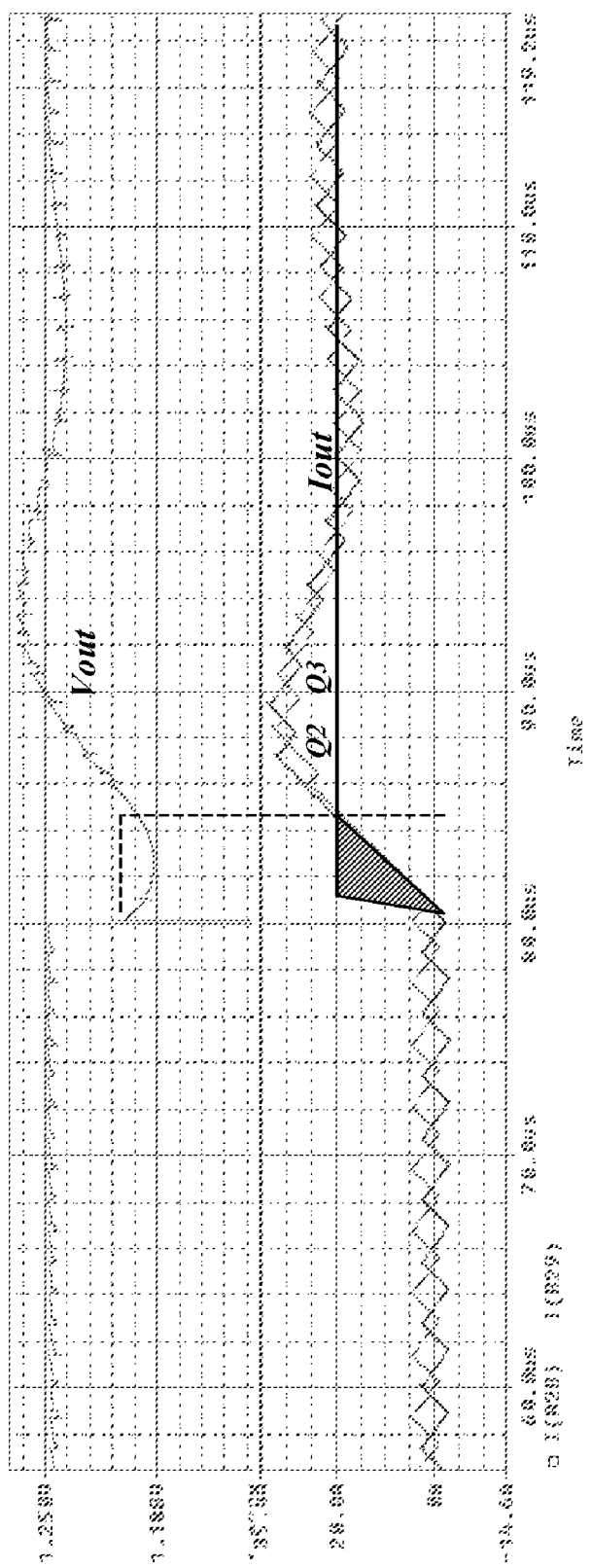
Figure 7:
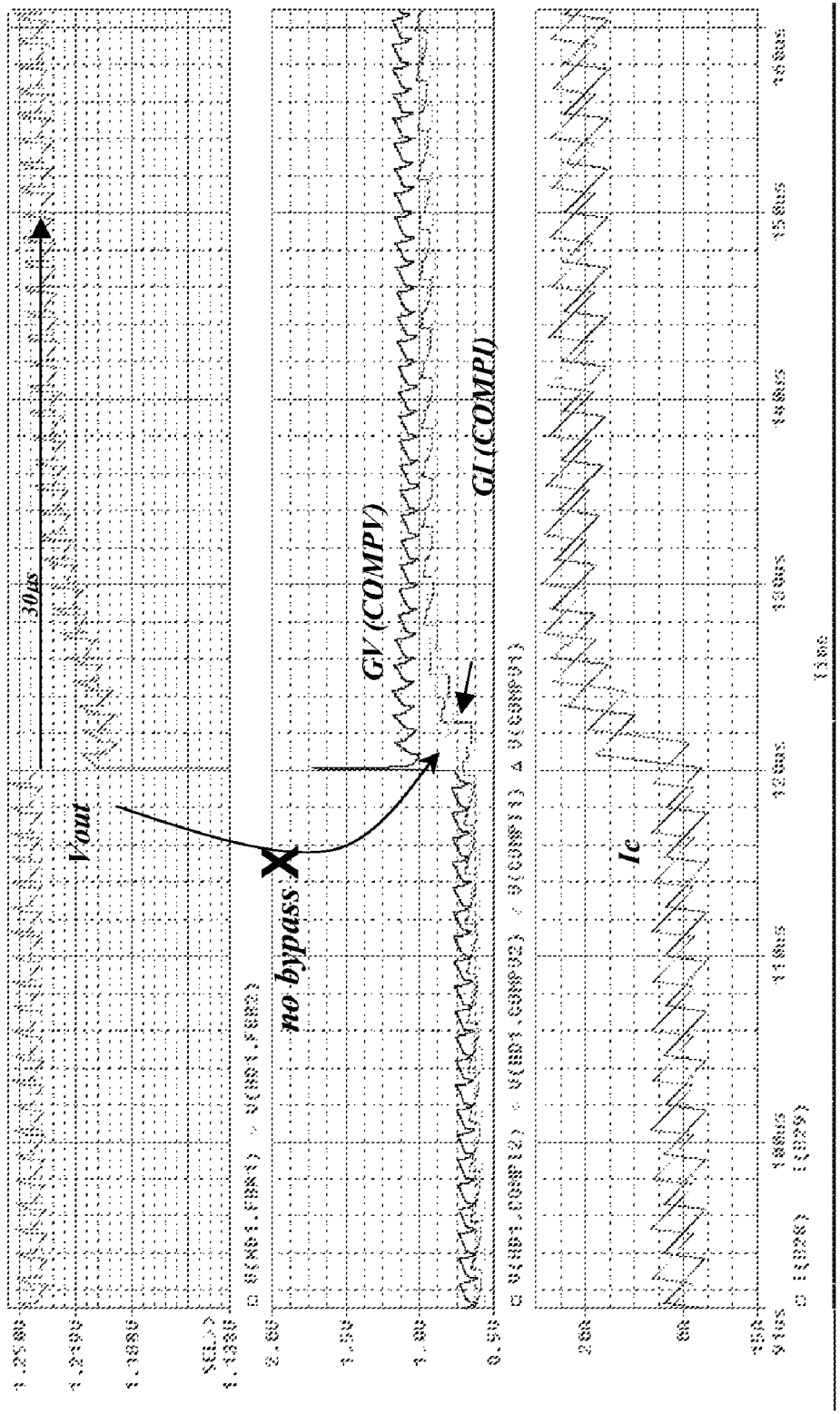
Figure 8:
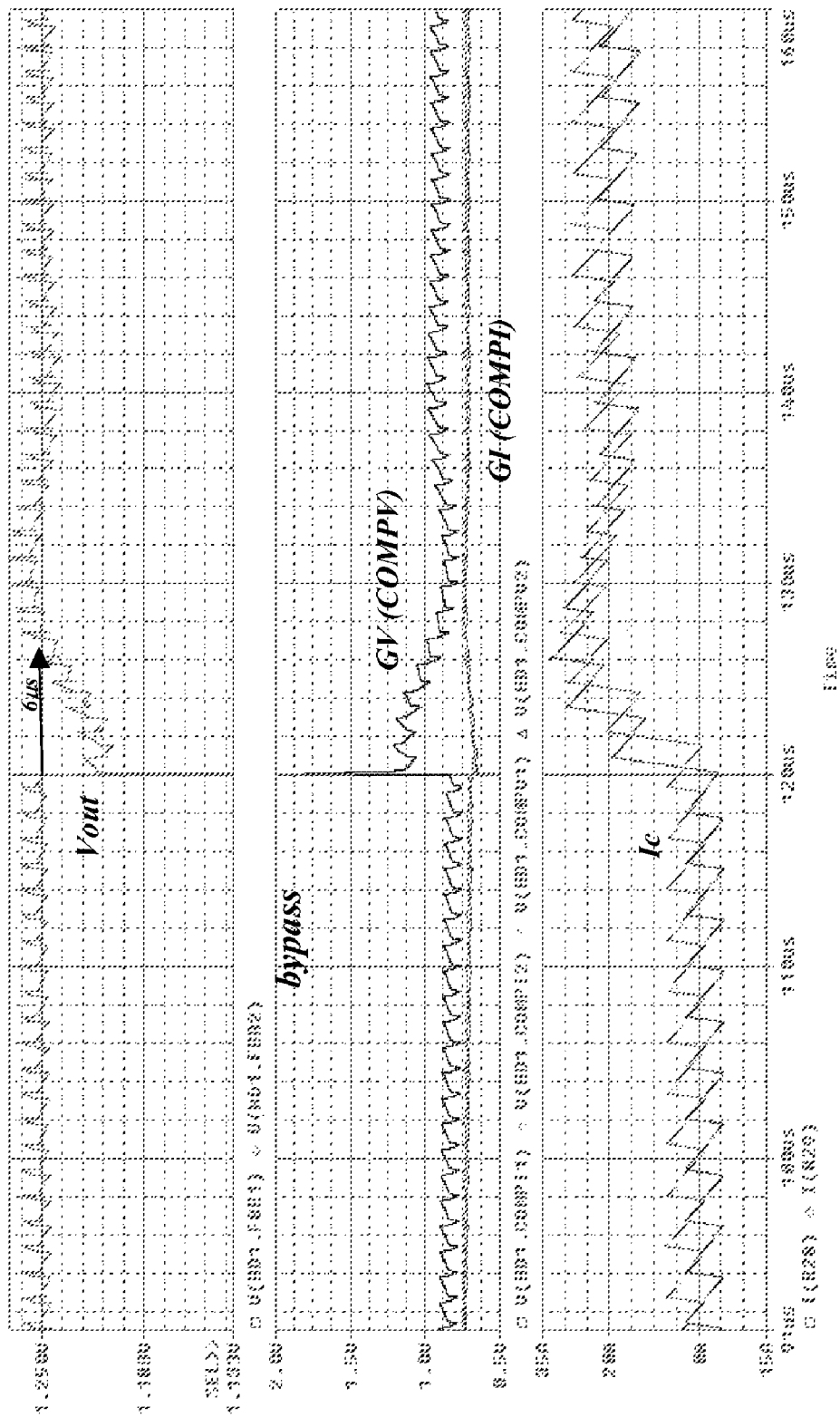

FIG. 4 shows that when the current increases, the node Gi enhances making the ramp intersect with the voltage Vdc. The full load duty clamp (DutyClampFull) is obtained from the following.

$$DutyClampFull := \frac{Vdc - Ilim \cdot Rcc - Gibias \cdot Rcc}{DVosc}$$

The comparator 8 compares the signal Gi to which the PWM ramp has been summed with the signal Gv. The comparison generates the PWM square wave whose digital value "1" commands the driver 4 to turn on the power MOS transistor of the Highside 7 and to turn off the Lowside, or vice versa.

The PWM ramp is generated without having, as reference, a constant voltage while having, as reference, the signal Gi.

Each phase is characterized by a ramp generated in this way; each one's result to be offset with respect to the other by a time delay equal to the period divided by the number of phases (interleaving, for two phases the phase displacement is equal to half the period).

To verify the correct operation of the controller 1, reference has been made to all the possible ways to connect two DC-DC converters.

The diagrams of the simulations of FIGS. 5 to 8 refer to this type of application.

"Stand Alone" Use

By mere way of example, a single phase application can be considered as characterized by the following parameters.

L=350 nH inductance of ZL
RL=1 mOhm resistive value of ZL
Fsw=500 KHz switching frequency
Cout=2×(560 uF with ESR=6 mOhm and ESL=2nH)
HighSide/Lowside=with Rdson=Rsense=5 mOhm
Vout=1.25V nominal output voltage
Iocp=25A overcurrent protection
Vin=3.3V-12V input voltages
Iout=20A with dI/dt=20 A/100 ns
Np=1-2 number of interleaving phases While as inner parameters of the controller we can choose:
Ilim=100 uA threshold Overcurrent comparator allows to calculate Rg from Iocp
Gibias=50 uA reference current necessary for calculating Rcc and Rc
Dvosc=1.5V height of PWM ramp necessary for calculating Zf, Zcc
Vdd=3.5V inner supply device necessary for calculating Rcc and Rc Vdrop=0.25V inner voltage of the device necessary for calculating Rcc and Rc The current information of the phase Ic is transformed into voltage due to the resistance (Vc) drawn at the output of the Error amplifier 5. This realizes a current mode system (thus with intrinsic current sharing) but does not generate load effect since when the load changes Vc increases, Vc is divided by an enormous gain of the error amplifier for being brought back onto the node of the output voltage; then, it does not produce variations of the regulated voltage.

In this configuration, each Vin bus supplies its relative output voltage with power.

Multi-Phase

In this configuration, the Vin bus supplies the output voltages connected in multi-phase interleaving with power.

Power Division

In this configuration, both the Vin buses supply the single output voltage that the DC-DC converters, connected in multi-phase interleaving, refer to with current.

The powers absorbed by the Vin can be equalized or a determined amount of power can be programmed.

GloopV Calculation

Using equation (4) it is possible to calculate the overall loop gain Vout/Vs.

$$\frac{Vout}{P \cdot Zp(s)} \cdot (Zp(s) + ZL(s))(1 - GloopI) := \qquad \text{eq (4)}$$

$$-Gea \cdot Vs \cdot Zf(s) - \frac{Vs \cdot Zfcw(s)}{Zw(s)}$$

$$\frac{Vout}{Vs} := -P \cdot Zp(s) \cdot \frac{Gea \cdot Zf(s) + \frac{Zfcw(s)}{Zw(s)}}{1 - GloopI} \cdot \frac{Zf(s)}{Zp(s) + ZL(s)}$$

$$GloopV(s, Ro) :=$$

$$\frac{-\left[Zp(s, Ro) \cdot P \cdot Gea \cdot Zf(s) \cdot \left(1 + \frac{Zfcw(s)}{Zw(s)Gea \cdot Zf(s)}\right)\right]}{Zp(s, Ro) + ZL(s)} \cdot$$

$$\frac{\left[1 - s \cdot \frac{1}{(6.28 \cdot Fsw)}\right]^2}{(1 - GloopI\_calc(s, Ro))}$$

$$Gbypass(s) := \left(1 + \frac{Zfcw(s)}{Zw(s)Gea \cdot Zf(s)}\right)$$

In GloopV the singularities have been inserted which take into account the high frequency sampling effect; moreover, the sole terms depending, in an explicit way, on Zw (i.e., G-bypass) have been collected.

The term Gea×Zf(s) is a very big term, and thus G-bypass remains equal to 1 (0 dB) (i.e., it does not affect the study of the system stability).

If GloopI owns a GBWP greater than GloopV, it remains in greater module than the unit and it is thus possible in GloopV to substitute 1-GloopI only for GloopI. In this way the GloopV resonance (Zp+ZL) is erased by GloopI, and GloopV is dominated by Zp×(GeaZf)/Zfcw.

Not having load effect (droop) means having a very high gain of the error amplifier 5. This means that the GloopV represents an integrator.

The integrator is exactly given by the impedance Zf; at mean frequency Zf it stops integrating due to its zero frequency at ~100 Hz (see B); this zero is followed by the singularities of 1/Zfcw, i.e., a zero ~1 KHz (see C) and a pole at ~10 KHz (see E); the zero at 1 KHz does not change the characteristics since it is compensated by the pole of Zp (due to the output load, see D); only one pole thus remains which ensures a very high phase margin and with it stability.

Response to the Transistors

An example of how the bypass acts in transient will now be shown.

In a voltage mode system, even if the compensation network ensures the high gain with low frequency necessary to not have load effect (one pole) and the compensation network introduces the two zeroes necessary for contrasting the loss of the phase margin due to the resonance of the output filter (Zp+ZL, with two conjugated complex poles), it is impossible to not have over-elongations in response to the load.

This occurs since the slope with which the inductance current increases is however much lower with respect to the load slope.

Having to bring the output voltage (above) to its original value, a current overshoot is necessary for equalizing the charges Q1 with Q2; at this point, the inductance current, also having to be brought to its final value (coinciding with Io), forces the Vout to an over-elongation (Q3). This behavior corresponds, in the space of the frequencies, to the presence, however, of the output filter resonance.

In current mode systems such as the one of this embodiment of the present invention this does not occur and, as previously seen, the GloopV resonance is not present.

In fact, in the current mode without bypass, the duty cycle increase is controlled by the jump performed by GV. The modulator thus increases the duty cycle and thus the current flowing in the inductances increases. Further to this increase, GI enhances and, with it, the PWM ramps enhance. These slow the increase of the duty cycle controlled by GV and, they prevent the over-elongations.

However, the response times in the transistors are longer than in voltage mode regulation systems. It is thus important to increase, as much as possible, the GBWP of GloopV. The bypass compensation is suitably provided for this purpose.

The response times halve. Now the Vout fall is transmitted through the impedance Zw directly to GI which, before slowing the increase of the duty cycle controlled by GV, must wait for the coupling with Vout ends.

In other words, the Vout fall further to the load variation is transmitted to the control of the PWM directly (on GI) outperforming (bypass) the error amplifier 5.

The device according to this embodiment of the present invention solves the technical problem in an efficient and economic way.

This also allows use in a great variety of applications in which it is necessary to manage different currents by applying all the known advantages of interleaving (cost decrease of the input and output capacities, increase of the efficiency, etc.).

When the currents are low, each controller will regulate its output voltage. The concept extends to a generic number of phases (or to a generic number of DC-DC converters) due to the innovative sampling system (track&hold) of the phase current read through the Rdson of the MOS transistor of the Lowside.

The bypass compensation technique optimizes the system response to the load variations reducing the recovery times.

A user will be allowed to separately enable the phases by programming, for each, the softstart, the overcurrent threshold, the output voltage; for each phase there will be the protection of overvoltage, feedback disconnection and the PGOOD; management of the softstart with the pre-charged output; making the phases operate in parallel, i.e., interleaving multiphase deciding to program the division of the currents between the two phases; during the two-phase operation disable a phase for energetic saving and enable it again when necessary without losing the output control; and in the two-phase operation divide the power required by the load by different supply buses by programming, for each one, a power amount.

The present invention is particularly, but not exclusively, suited to a controller for switching converters of highside and lowside driver half-bridge stages. The above description is made with reference to this field of application by way of illustration only.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A controller for DC-DC converters of the type associated with a half-bridge driving stage of at least one inductive load, with a pair of power MOS transistors in Highside and Lowside configuration being driven by a corresponding converter, the controller including an input for connection to a terminal of the inductive load, the controller comprising:
    a read block for reading an inductive load phase current at the terminal;
    an over current comparator having a first input coupled to an output of the read block;
    a bypass compensation network including an error amplifier block having a first input coupled to the terminal through a voltage divider, and a second input coupled to a reference potential; and
    a bypass impedance having a first terminal coupled to the voltage divider and a second terminal coupled to the first input of the over current comparator, so as to bypass the error amplifier in coupling the voltage at the terminal, after division, to the over current comparator,
    wherein an output of the error amplifier block is coupled to a second input of the over current comparator, and
    an output of the over current comparator is supplied to the DC-DC converter.

2. The controller according to claim 1, wherein the read block comprises a resistance for reading the phase current that corresponds to an inner resistance in the on state of the power MOS transistor of the Lowside of the stage.

3. The controller according to claim 1,
    wherein the error amplifier block consists of a transducer that transforms, with open loop, a voltage difference at its inputs into a current through a gain, and
    the transducer holds its gain constant in a range of +/−10% of the voltage difference at its inputs.

4. The controller according to claim 3, wherein the transducer has an output resistance of at least 100Mohm.

5. The controller according to claim 1, further comprising:
    an oscillator coupled between the output of the read block and the first input of the over current comparator.

6. The controller according to claim 5, wherein the oscillator generates a ramp signal using the signal at the output of the read block as reference, so as to sum the ramp and the signal at the output of the read block.

7. The controller according to claim 1, further comprising an RCR circuit coupled to the read block.

8. The controller according to claim 1, further comprising:
    a resistance Rg connected between the terminal of the inductive load and the read block,
    wherein the read block is characterized by a gain K that equals Rsense/Rg, where Rsense is substantially an inner resistance in the on state of the power MOS transistor of the Lowside.

9. The controller according to claim 1, wherein the first terminal of the bypass impedance is coupled to the second input of the over current comparator through the error amplifier.

10. A controller for DC-DC converters of the type associated with a half-bridge driving stage of at least one inductive load, with a pair of power MOS transistors in Highside and Lowside configuration being driven by a corresponding converter, the controller including an input for connection to a terminal of the inductive load, the controller comprising:
    a read block for reading an inductive load phase current at the terminal;
    an over current comparator having a first input coupled to an output of the read block;
    a bypass compensation network including an error amplifier block having a first input coupled to the terminal through a voltage divider, and a second input coupled to a reference potential; and
    a bypass impedance having a first terminal coupled to the first input of the error amplifier block, and a second terminal coupled to the first input of the over current comparator, the first terminal of the bypass impedance and the first input of the error amplifier block being connected to the same node of the voltage divider,
    wherein an output of the error amplifier block is coupled to a second input of the over current comparator, and
    an output of the over current comparator is supplied to the DC-DC converter.

11. The controller according to claim 10,
    wherein the first input of the over current comparator is coupled to ground through a first compensation impedance,
    the second input of the over current comparator is coupled to ground through a second compensation impedance, and
    the first compensation impedance is also coupled to the second terminal of the bypass impedance.

12. An information processing system including at least one controller for DC-DC converters of the type associated with a half-bridge driving stage of at least one inductive load, with a pair of power MOS transistors in Highside and Lowside configuration being driven by a corresponding converter, the controller including an input for connection to a terminal of the inductive load, the controller comprising:
    a read block for reading an inductive load phase current at the terminal;
    an over current comparator having a first input coupled to an output of the read block;
    a bypass compensation network including an error amplifier block having a first input coupled to the terminal through a voltage divider, and a second input coupled to a reference potential; and
    a bypass impedance having a first terminal coupled to the voltage divider and a second terminal coupled to the first input of the over current comparator, so as to bypass the error amplifier in coupling the voltage at the terminal, after division, to the over current comparator, wherein an output of the error amplifier block is coupled to a second input of the over current comparator, and an output of the over current comparator is supplied to the DC-DC converter.

13. The information processing system according to claim 12, wherein the read block of the controller comprises a resistance for reading the phase current that corresponds to an inner resistance in the on state of the power MOS transistor of the Lowside of the stage.

14. The information processing system according to claim 12, wherein the error amplifier block consists of a transducer that transforms, with open loop, a voltage difference at its inputs into a current through a gain, and the transducer holds its gain constant in a range of +/−10% of the voltage difference at its inputs.

15. The information processing system according to claim 14, wherein the transducer has an output resistance of at least 100Mohm.

16. The information processing system according to claim 12, wherein the controller further comprises an oscillator coupled between the read block and the first input of the over current comparator.

17. The information processing system according to claim 12, wherein the controller further comprises an RCR circuit coupled to the read block.

18. An information processing system including at least one controller for DC-DC converters of the type associated with a half-bridge driving stage of at least one inductive load, with a pair of power MOS transistors in Highside and Lowside configuration being driven by a corresponding converter, the controller including an input for connection to a terminal of the inductive load, the controller comprising:

a read block for reading an inductive load phase current at the terminal;

an over current comparator having a first input coupled to an output of the read block;

a bypass compensation network including an error amplifier block having a first input coupled to the terminal through a voltage divider, and a second input coupled to a reference potential; and a bypass impedance having a first terminal coupled to the first input of the error amplifier block, and a second terminal coupled to the first input of the over current comparator, the first terminal of the bypass impedance and the first input of the error amplifier block being connected to the same node of the voltage divider, wherein an output of the error amplifier block is coupled to a second input of the over current comparator, and an output of the over current comparator is supplied to the DC-DC converter.

19. The information processing system according to claim 18, wherein the first input of the over current comparator of the controller is coupled to ground through a first compensation impedance, the second input of the over current comparator of the controller is coupled to ground through a second compensation impedance, and the first compensation impedance is also coupled to the second terminal of the bypass impedance.

* * * * *